(12) United States Patent
Yoshinaga et al.

(10) Patent No.: US 7,182,266 B2
(45) Date of Patent: Feb. 27, 2007

(54) NONCONTACT IC CARD READER/WRITER

(75) Inventors: Hiroshi Yoshinaga, Kasuya-gun (JP); Futoshi Deguchi, Fukuoka (JP); Masahiko Tanaka, Fukuoka (JP); Akihiko Hirata, Fukuoka (JP); Hiroaki Haruyama, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 275 days.

(21) Appl. No.: 10/878,633

(22) Filed: Jun. 29, 2004

(65) Prior Publication Data

US 2005/0029351 A1    Feb. 10, 2005

(30) Foreign Application Priority Data

Jun. 30, 2003    (JP) .................... P. 2003-186822

(51) Int. Cl.
*G06K 19/06*    (2006.01)
(52) U.S. Cl. .................. 235/492; 235/487; 235/380
(58) Field of Classification Search ................ 235/439, 235/449, 450, 451, 380, 382, 375, 492, 487
See application file for complete search history.

(56) References Cited

U.S. PATENT DOCUMENTS

2002/0014529 A1* 2/2002 Tanaka .................. 235/449

FOREIGN PATENT DOCUMENTS

| JP | 10256957 | 9/1998 |
| JP | 2002007976 | 1/2002 |

* cited by examiner

*Primary Examiner*—Karl D. Frech
(74) *Attorney, Agent, or Firm*—Stevens, Davis, Miller & Mosher, LLP

(57) ABSTRACT

The object of the invention is to provide a small-sized noncontact IC card reader/writer that can enhance the efficiency of an amplifier at a low cost. To achieve the object, in the invention, a loop antenna that supplies electric power and a send signal to a noncontact IC card by electromagnetic induction and acquires a receive signal from the noncontact IC card by load fluctuation, a first resonance circuit for resonating the loop antenna with a desired first frequency, a radio transmitter that supplies electric power and send data to the loop antenna via the first resonance circuit and further, a radio receiver that acquires the receive signal from the loop antenna via a second resonance circuit connected to the loop antenna via a coupling capacitor and resonated with a desired second frequency are provided, the radio transmitter and the radio receiver are respectively connected to CPU, and a low-pass filter for removing a high frequency, a class E amplifier and a modulator are connected to the radio transmitter in series.

13 Claims, 5 Drawing Sheets

GATE VOLTAGE

DRAIN VOLTAGE

Is+Ic

NONCONTACT IC CARD READER/WRITER

BACKGROUND OF THE INVENTION

1. Field of the Invention

The present invention relates to a noncontact IC card reader/writer, particularly relates to a noncontact IC card reader/writer the efficiency of which is improved and the receive sensitivity of which is also improved by using an efficient class E amplifier for an amplifier and in addition, by branching send/receive at the end of an antenna in a matching circuit.

2. Description of the Related Art

Heretofore, a reading/writing system using an IC card has been generally called a noncontact IC card system and is being practically utilized for an entrance/outgoing management system utilizing a frequency band of 13.56 MHz for example, a physical distribution system, an air cargo management system and others.

This system is provided with a noncontact IC card 101 having an IC chip 103 and an antenna coil 102 on one card made of resin and a reader/writer 105 that communicates with the noncontact IC card 101 as shown in FIG. 3, and the reader/writer 105 is provided with a loop antenna 104. FIG. 3 is a conceptual drawing showing a conventional type noncontact IC card system. Electric power and send data are constantly or intermittently transmitted via the loop antenna 104 and receive data from the noncontact IC card 101 located in a range in which the electric power and the send data can be received is acquired.

Further, a reader/writer of a noncontact IC card system disclosed in JP-A-2002-7976 is shown in FIG. 4. FIG. 4 are block diagrams showing parts related to the connection of the reader/writer of the conventional type noncontact IC card system and a noncontact IC card. FIG. 4A shows a case that the loop antenna 104 and a capacitor form a parallel resonance circuit and FIG. 4B shows a case that the loop antenna 104 and a capacitor form a series resonance circuit. Referring to FIGS. 3 and 4, the operation of the noncontact IC card system in a conventional type example 1 will be described below.

First, in case send data is transmitted, a carrier wave from a prior oscillator is input to a modulator and is modulated based upon send data (not shown). The modulated wave is amplified in a power amplifier 106 shown in FIG. 4 and is transmitted from the loop antenna 104 via a matching circuit 107.

In case only electric power is transmitted, a carrier wave from the prior oscillator is transmitted as it is without modulation. The transmission from the reader/writer to the noncontact IC card 101 is made because a magnetic flux generated by the loop antenna 104 is interlinked with the antenna coil 102 of the noncontact IC card 101 and induced power is excited by electromagnetic coupling. On the side of the noncontact IC card 101, voltage induced by the antenna coil 102 is rectified in a rectifying circuit (not shown) in the IC chip 103 and is used for a power source of each circuit in the noncontact IC card 101. Besides, the same induced voltage is conducted to a demodulator circuit (not shown) and data from the reader/writer 105 is demodulated there.

Next, when data is transmitted from the noncontact IC card 101 to the reader/writer 105, the reader/writer 105 transmits an unmodulated carrier wave and supplies only electric power to the noncontact IC card 101. In a modulator circuit (not shown) composed of a load resistor (not shown) connected to the antenna coil 102 for example and a switch (not shown) on the side of the noncontact IC card 101, the switch is turned on or off according to a bit "1" or "0" of data read from a memory (not shown) in the IC chip 103. When the switch is turned on or off as described above, a load Z onto the antenna coil 102 varies, the variation is conducted to the loop antenna 104 on the side of the reader/writer 105 by electromagnetic induction, impedance on the side of the loop antenna 104 varies, and voltage/current, that is, impedance at a point A shown in FIG. 4A varies according to send data from the noncontact IC card 101. As a result, the amplitude of a high-frequency signal varies. That is, amplitude modulation is applied to the high-frequency signal depending upon data in the noncontact IC card 101. The modulated high-frequency signal is demodulated in a demodulator circuit 108 and receive data is acquired.

Besides, JP-A-10-256957 is known as an example that a class E amplifier is used for the readers/writers of these noncontact IC card systems and referring to FIG. 5, a conventional type example 2 will be described below. FIG. 5 is a block diagram showing a reader/writer of a conventional type noncontact IC card system. In FIG. 5, a part of the reader/writer disclosed in the patent document 2 is integrated in a simple block.

As shown in FIG. 5, a reference number 115 denotes an antenna, 116 denotes a class E amplifier, 117 denotes an impedance matching network, 118 denotes a capacitor, 119 denotes a filter circuit, 120 denotes CPU, Tr11 denotes a transistor, L11 denotes a coil, D11 denotes a diode, C12 denotes a second capacitor, L12 denotes a second coil, C13 denotes a third capacitor, C14 denotes a fourth capacitor, the class E amplifier 116 is connected to the antenna 112, CPU 120 and the impedance matching network 117, the other end of the impedance matching network 117 is connected to a power source, further, the class E amplifier 116 and the impedance matching network are connected to the filter circuit 119 via the coupling capacitor 118, and the other end of the filter circuit 119 is connected to CPU 120.

The class E amplifier 116 will be described in detail below. As shown in FIG. 5, the class E amplifier 116 uses the transistor Tr11 for a switching device, a base functions as an input terminal, an emitter is grounded, a collector is connected to the coil L11 the other end of which is connected to the power source and one end of the second coil L12, further, the diode D11 and the second capacitor C12 are connected in parallel between the collector and the ground, the other end of the second coil L12 is connected to the third capacitor C13, further, the other end of the third capacitor C13 is connected to the fourth capacitor C14 one end of which is grounded, and the other end of the third capacitor C13 functions as an output terminal.

Next, the operation of the reader/writer will be described. When the noncontact IC card is inserted into the reader/writer, a detecting circuit outside the drawing detects the IC card and sends a transmission start signal to CPU 120. CPU 120 that receives the transmission start signal turns on the power source of the class E amplifier 116 and sends a modulated data signal to the class E amplifier 116. In the class E amplifier 116, the modulated data signal is amplified, is shaped into a sine wave and is transmitted from the antennal. The send data signal output from CPU 120 is a digital signal, when the signal is at a high level, the transistor Tr11 is turned off, and when the signal is at a low level, the transistor is turned on. As described above, the transistor Tr11 executes switching operation, however, the leading edge and the trailing edge of the switching operation are temporally depressed at the collector of the transistor Tr11 by a circuit called a loading network composed of the coil L11, the second capacitor C12, the second coil L12 and the third capacitor C13, and is output from the collector in a state close to not a rectangular wave but a sine wave. According to this amplifying system called switching amplification, amplifying operation can be efficiently executed. In the case of the conventional type example 2, when the noncontact IC card is inserted, the transistor Tr11 is adjusted so that the operation of a class E is executed.

The noncontact IC card and the antenna of the noncontact IC card reader/writer can be regarded as a transformer when they communicate, and normally in such a case, as the transformer is often loosely coupled, reactance caused in a loose coupling state is negated by the fourth capacitor and stable operation is assured.

The noncontact IC card that receives a send signal responds with load fluctuation as in the conventional type example 1 and after an undesired wave is removed in the filter circuit 119 via the loading network of the class E amplifier in the case of the conventional type example 2, the load fluctuation is demodulated in CPU 120. In this conventional type example 2, the low-power consumption reader/writer of the noncontact IC card system is realized by making the amplifier operate at the class E only when the noncontact IC card approaches and a signal from it can be received as described above.

However, in case the reader/writer having large output of the noncontact IC card system is realized by the above-mentioned conventional type configuration, some problems occur.

First, in case no noncontact IC card exists around, the amplifier is not stably operated and the efficiency is deteriorated. Therefore, an insertion detector or a cooler is required and it is difficult to realize the small-sized and low-priced power transmitter described as the advantage of the patent document 2 described as the conventional type example 2. Second, as the loading network used for a filter for the output of the power amplifier has low-order filter circuit configuration, capacity to remove a high frequency is small and it is very difficult to inhibit extraneous emission. Third, not only the sensitivity is deteriorated because the potential of a receive signal is divided in a circuit including an impedance component but the efficiency of the amplifier is deteriorated. The transistor used for a switching device in the patent document 2 has various problems such as the efficiency of the amplifier is deteriorated because the ON-state resistance of the transistor is large.

SUMMARY OF THE INVENTION

The invention is made to solve the above-mentioned problems in the prior art and the object is to provide a small-sized noncontact IC card reader/writer in which the efficiency of an amplifier can be enhanced at a low cost.

To achieve the object, in the invention, a loop antenna that supplies electric power and a send signal to a noncontact IC card by electromagnetic induction and acquires a receive signal from the noncontact IC card by load fluctuation, a first resonance circuit for resonating the loop antenna with a desired first frequency, a radio transmitter that supplies electric power and send data to the loop antenna via the first resonance circuit and further, a radio receiver that acquires the receive signal from the loop antenna via a second resonance circuit connected to the loop antenna via a coupling capacitor and resonated with a desired second frequency are provided, the radio transmitter and the radio receiver are respectively connected to CPU, and a low-pass filter for removing a high frequency, a class E amplifier and a modulator are connected to the radio transmitter in series.

DETAILED DESCRIPTION OF THE PREFERRED EMBODIMENT

Figure 1:
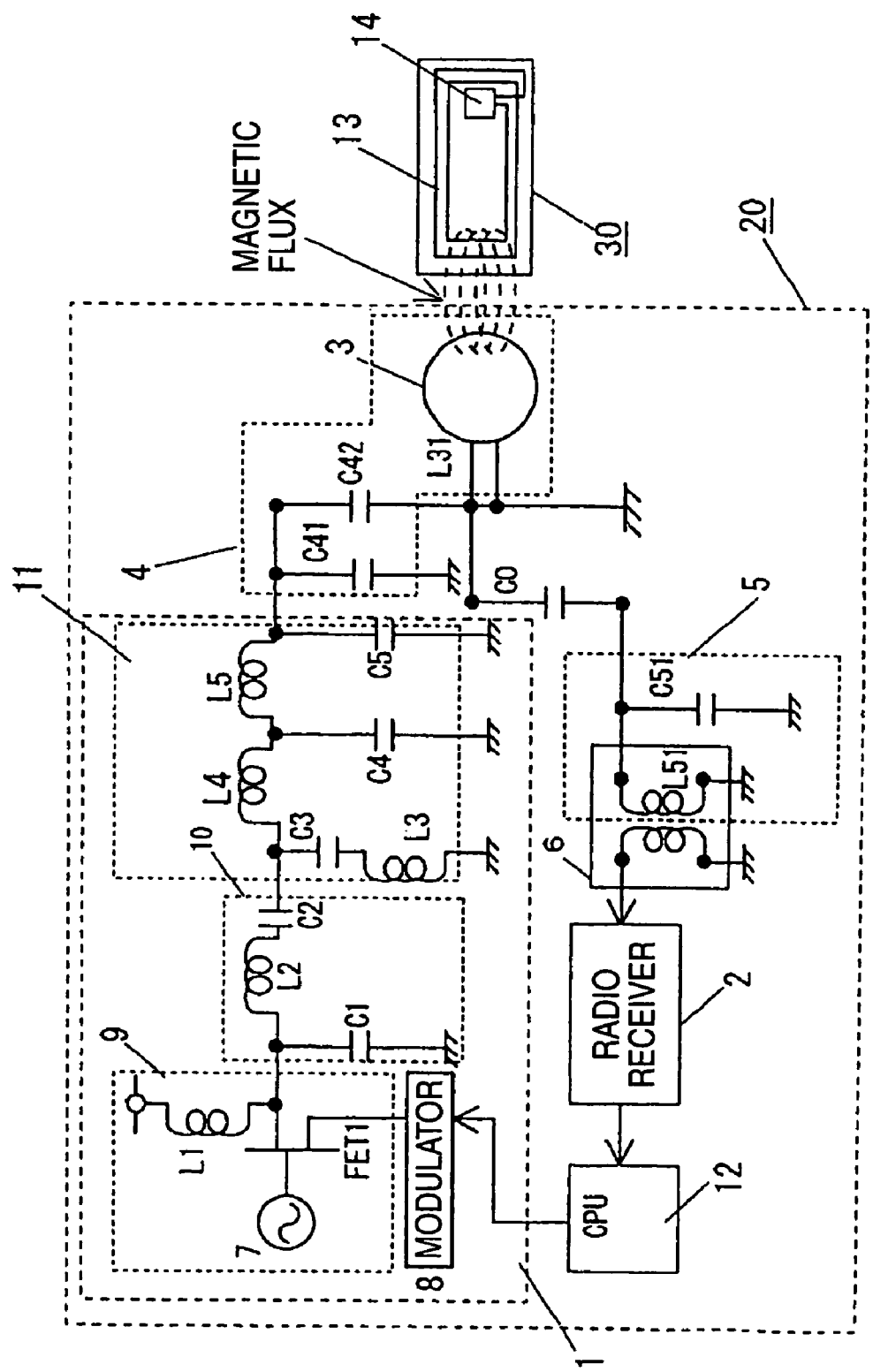
FIG. 1 is a block diagram showing a noncontant IC card reader/writer equivalent to one embodiment of the invention.

The invention disclosed in a first aspect is based upon a noncontact IC card reader/writer that communicates data with a noncontact IC card or a noncontact IC tag, and is characterized in that a loop antenna that supplies electric power and a send signal to the noncontact IC card by electromagnetic induction and acquires a receive signal from the noncontact IC card by load fluctuation, a first resonance circuit for resonating the loop antenna with a desired first frequency, a radio transmitter that supplies electric power and send data to the loop antenna via the first resonance circuit and further, a radio receiver that acquires the receive signal from the loop antenna via a second resonance circuit connected to the loop antenna via a coupling capacitor and resonated with a desired second frequency are provided, the radio transmitter and the radio receiver are respectively connected to CPU, the resonance circuit dedicated to a transmit frequency and the resonance circuit dedicated to a receive frequency can be provided by connecting a low-pass filter for removing a high frequency, a class E amplifier and a modulator to the radio transmitter in series and the efficiency of the class E amplifier can be enhanced.

The invention disclosed in a second aspect is characterized in that the class E amplifier uses FET for a switching device, FET is provided with configuration that the gate of FET is connected to a signal generator, the drain is connected to the other end of a coil one end of which is connected to a power source, further, the drain is connected to a loading network and the source is connected to the modulator and the efficiency of the class E amplifier can be further enhanced.

The invention disclosed in a third aspect is characterized in that the loading network is configured so that the other end of a capacitor one end of which is grounded and a second coil are connected to its input terminal, the other end of the second coil is connected to a second capacitor and the other end of the second capacitor functions as an output terminal of the loading network, a constant of the loading network is set to a desired value so that the class E amplifier constantly executes the operation of a class E and the noncontact IC card reader/writer can constantly execute the operation of the class E.

The invention disclosed in a fourth aspect is characterized in that the low-pass filter is provided with configuration that a third capacitor and a third coil are connected in series between an input terminal of the low-pass filter and the ground, further, a fourth coil is connected to the input terminal, a fifth coil is connected to the other end of the fourth coil, the other end of the fifth coil functions as an output terminal of the low-pass filter, a fourth capacitor one end of which is grounded is connected between the fourth coil and the fifth coil and a fifth capacitor one end of which is grounded is connected to the other end of the fifth coil and capacity to remove a high frequency can be enhanced.

The invention disclosed in a fifth aspect is characterized in that the third capacitor and the third coil respectively arranged in series between the input terminal of the low-pass filter and the ground are also used for a compensating circuit for removing reactance and the further stable operation of the class E amplifier can be acquired.

Figure 2:
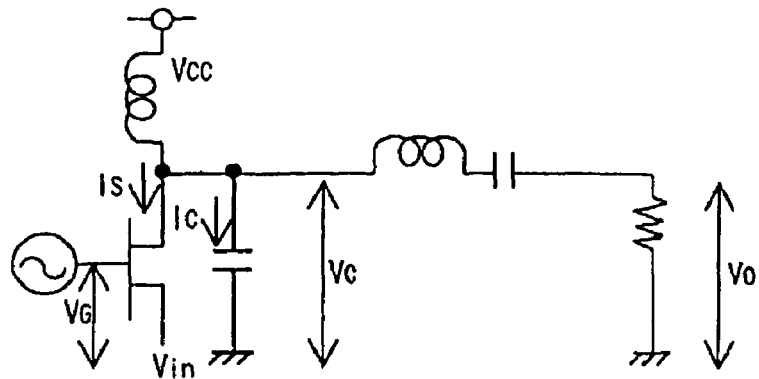
FIG. 2 are explanatory drawings for explaining the operational principle of a class E amplifier.
Figure 2:
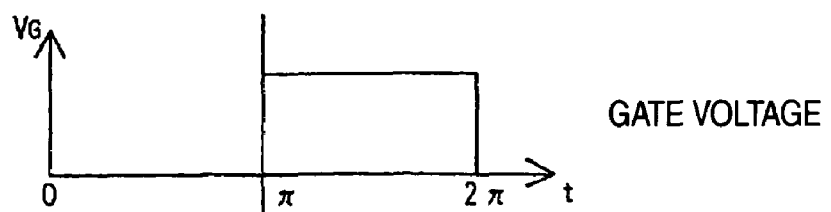
Figure 2:
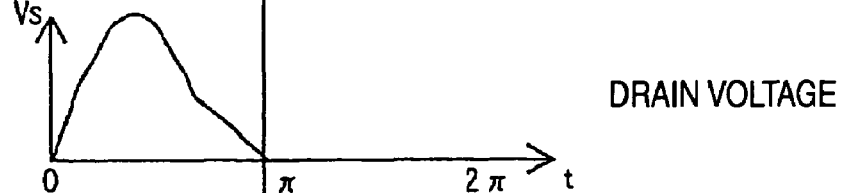
Figure 2:
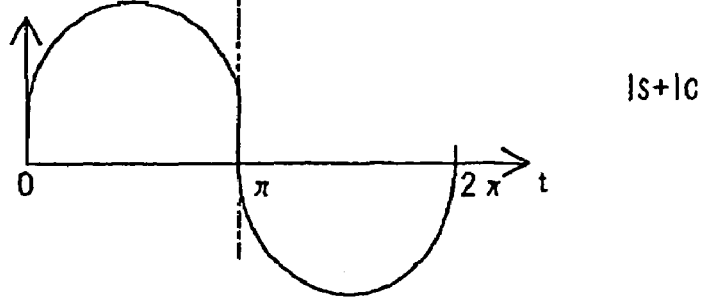
Figure 3:
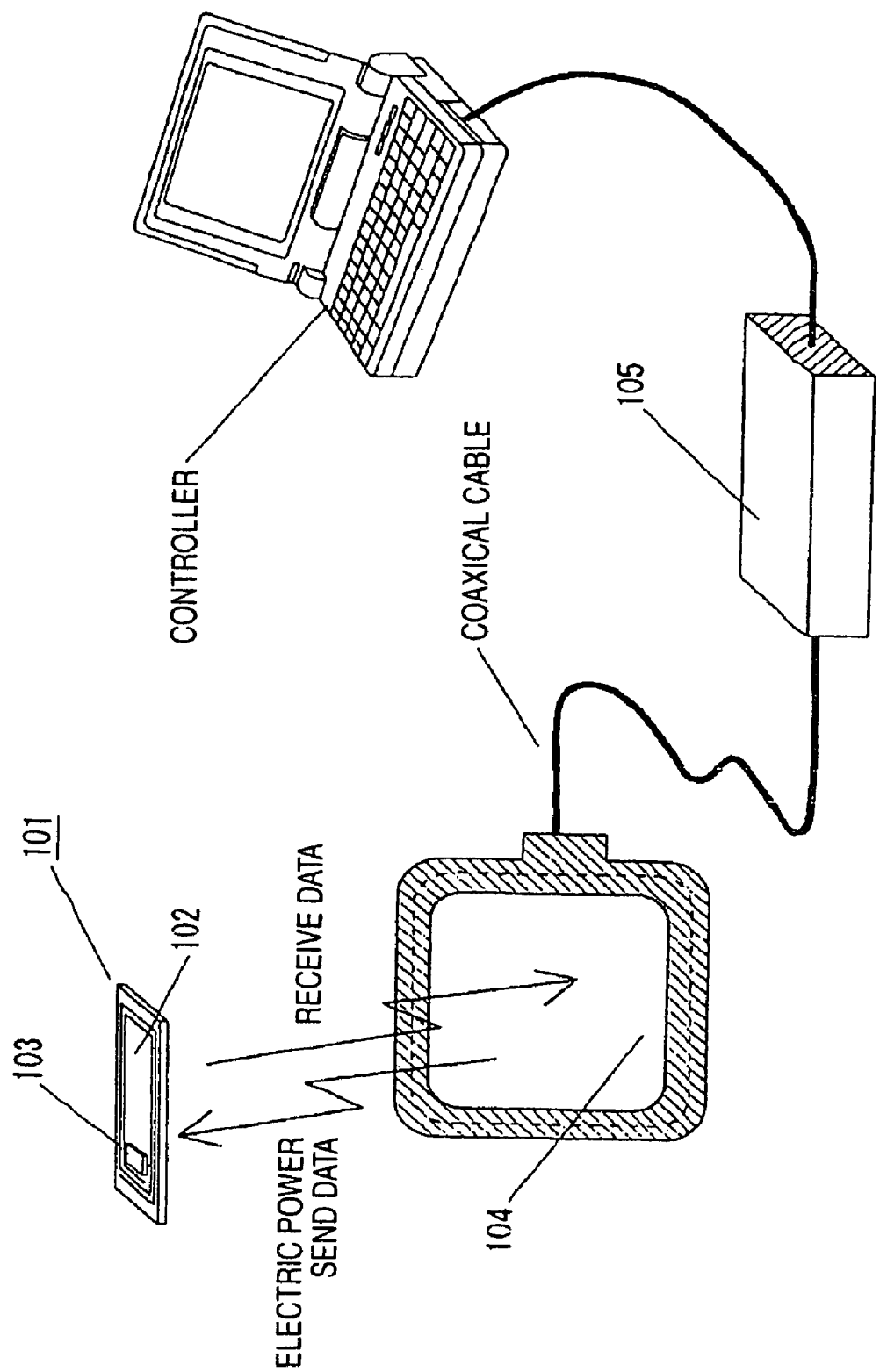
FIG. 3 is a conceptual drawing showing a conventional type noncontact IC card system.
Figure 4:
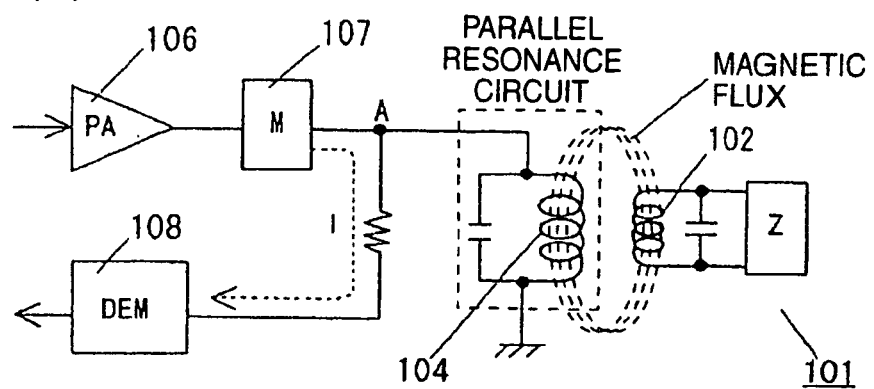
FIG. 4 are block diagrams showing a part related to the coupling of a reader/writer of the conventional type noncontact IC card system and a noncontact IC card.
Figure 4:
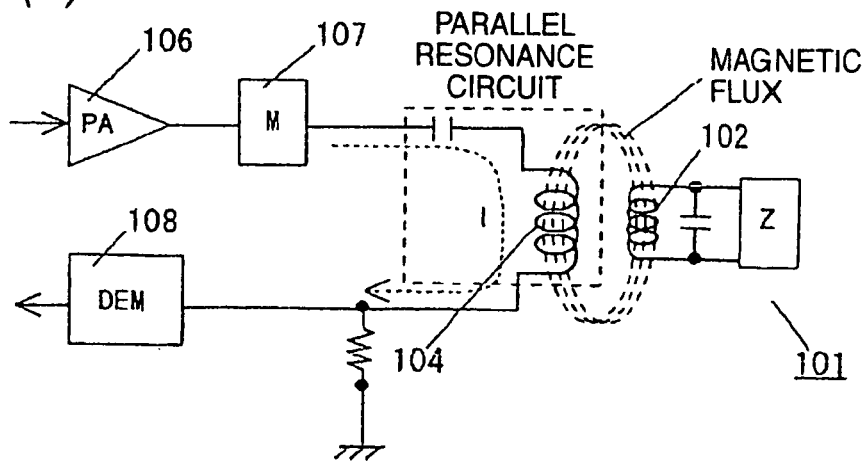
Figure 5:
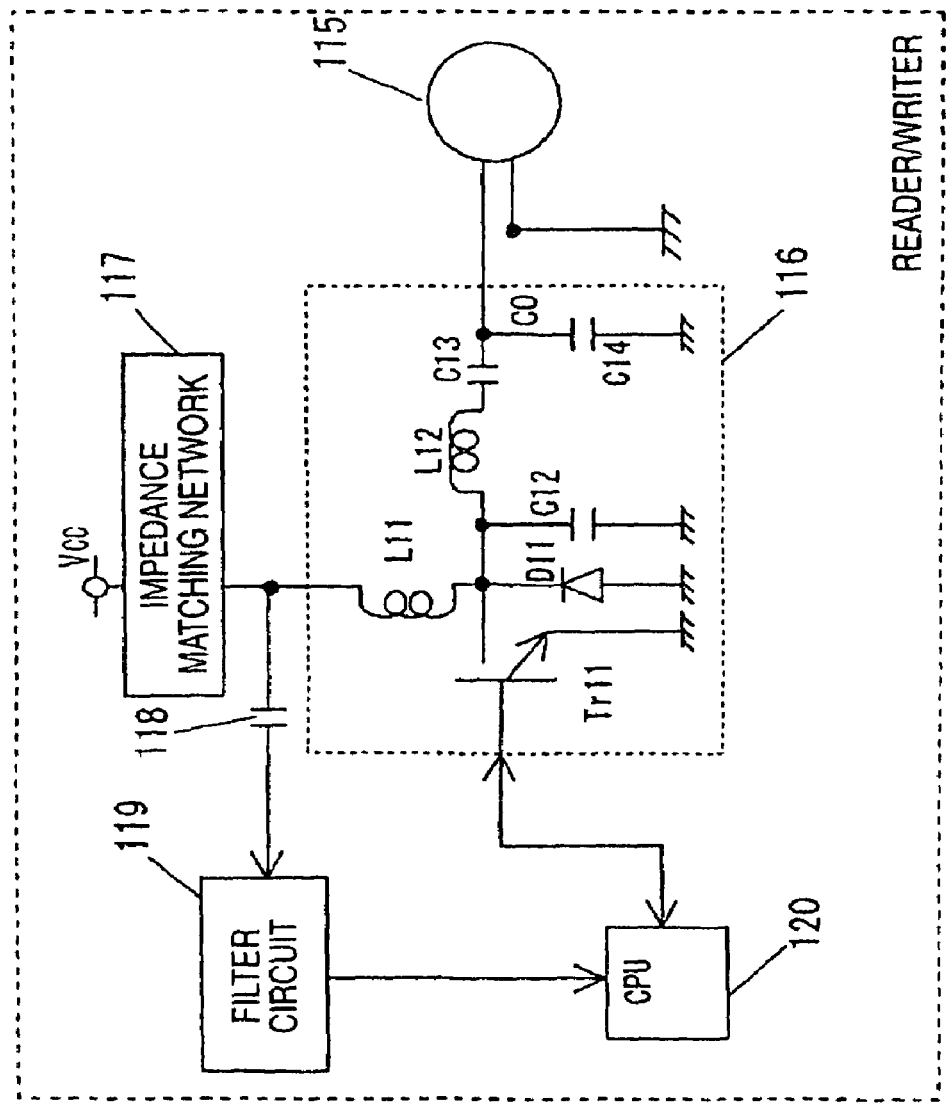
FIG. 5 is a block diagram showing the reader/writer of the conventional type noncontact IC card system.

Referring to FIGS. 1 and 2, one embodiment of the invention will be described below. The definition of a noncontact IC card in the invention is not limited to a so-called card but is a radio communication medium that can communicate with a reader/writer without contact. Therefore, the noncontact IC card includes ones called an IC tag, an ID tag and an identification label depending upon application.

FIG. 1 is a block diagram showing a noncontact IC card reader/writer equivalent to one embodiment of the invention. In this embodiment, a series resonance circuit is used for an example of a resonance circuit.

As shown in FIG. 1, a reference number 20 denotes the noncontact IC card reader/writer and it may be abbreviated as a reader/writer. A reference number 30 denotes a non-contact IC card. Further, a reference number 1 denotes a radio transmitter, 2 denotes a radio receiver, 3 denotes a loop antenna, 4 denotes a first resonance circuit, 5 denotes a second resonance circuit, 6 denotes a transformer, 7 denotes a signal generator, 5 denotes a modulator, 12 denotes CPU, 13 denotes an antenna coil, and 14 denotes an IC chip.

As shown in FIG. 1, the first resonance circuit 4 for resonating the loop antenna 3 with a desired first frequency and the radio transmitter 1 that supplies electric power and send data to the loop antenna 3 via the first resonance circuit 4 are provided, further, the radio receiver 2 that acquires a receive signal from the loop antenna 3 via the second resonance circuit 5 connected to the loop antenna 3 via a coupling capacitor C0 and resonated with a desired second frequency is provided, the radio transmitter 1 and the radio receiver 2 are respectively connected to CPU 12, and in the radio transmitter 1, the modulator 8, a class E amplifier 9, a loading network 10 and a low-pass filter 11 are connected in series.

In case send data is transmitted in FIG. 1, send data from CPU 12 is modulated in the modulator 8, is amplified in the class E amplifier 9, a high frequency is removed via the loading network 10 and the low-pass filer 11, and is transmitted from the loop antenna 3 via the first resonance circuit 4 shown in FIG. 1 and composed of C41, C42 and L31. Besides, in case only electric power is transmitted, a carrier wave from the signal generator 7 is transmitted as it is without modulation. The transmission from the reader/writer 20 to the noncontact IC card 30 is made because a magnetic flux generated by the loop antenna 3 is interlinked with the antenna coil 13 of the noncontact IC card 30 by electromagnetic coupling and induced voltage is excited.

In the noncontact IC card 30, the induced voltage at the antenna coil 13 is rectified in a rectifying circuit (not shown) in the IC chip 14 and issued for a power source of each circuit in the noncontact IC card 30. Besides, the same induced voltage is conducted to a demodulator circuit (not shown) and data from the reader/writer 20 is demodulated.

Next, when data is transmitted from the noncontact IC card 30 to the reader/writer 20, the reader/writer 20 transmits an unmodulated carrier wave and supplies only electric power to the noncontact IC card 30. On the side of the noncontact IC card 30, according to a bit "1" or "0" of data DATAb read from a memory (not shown) in the IC chip 14, a switch in a modulator circuit (not shown) composed of a load resistor (not shown) connected to the antenna coil 13 for example and the switch (not shown) is turned on or off. In the reader/writer 20, when the switch is turned on or off as described above, a load onto the antenna coil 13 varies. The variation is transmitted by electromagnetic induction to the loop antenna 3 on the side of the reader/writer 20 and impedance on the side of the loop antenna 3 varies. The data is demodulated in CPU 12 of the radio receiver 2 via the coupling capacitor C0 connected to the loop antenna 3 and the second resonance circuit 5 composed of C51 and L51. As described above, the noncontact IC card reader/writer 20 provided with the amplifier that can be efficiently operated can be realized.

Next, the class E amplifier 9 will be described in detail. In the detailed block of the class E amplifier 9, a reference number 7 denotes the signal generator, FET1 denotes FET for a switching device, L1 denotes a coil, the source of FET1 is connected to the modulator 8, the signal generator 7 is connected to the gate of FET1, the drain of FET1 is connected to the other end of the coil one end of which is connected to a power source and the loading network 10, and a capacitor C1 is connected between a node between the drain and a second coil L2 and the ground.

Further, the operation of the class E amplifier will be described. A send signal of a carrier frequency generated by the signal generator 7 is input to the gate of FET1, and as the signal is a digital signal, FET1 executes switching operation at the carrier frequency. When a send signal modulated in the modulator 8 is input, it is amplified up to the amplitude of power supply voltage at the drain of FET1. However, as this waveform is ideally rectangular (actually, as rise time and fall time are not zero, the waveform is not rectangular), an extra high frequency is included, the send signal is extracted in a state in which a leading edge and a trailing edge of the rectangular wave are depressed by setting the loading network 10 to a desired characteristic, and is shaped into a waveform close to a sine wave. This amplifying system is called switching amplification and the very efficient amplifier can be acquired.

Next, the loading network 10 will be described in detail. To explain the loading network 10 in detail, L2 denotes the second coil, C1 denotes the capacitor, C2 denotes a second capacitor, the drain of FET1 is connected to one end of the second coil L2, the other end of the second coil L2 is connected to the second capacitor C2, and the capacitor C1 is connected between the node between the drain and the second coil L2 and the ground.

As described above, a rectangular wave is output by only switching operation and many unnecessary components are generated. Then, a sine wave can be output in place of a rectangular wave by forming the loading network 10 by a series resonance circuit composed of L2 and C2 and adjusting a resonance frequency to a frequency of a carrier wave.

Referring to FIG. 2, the basic operational principle of the class E amplifier will be described below. FIG. 2 are explanatory drawings for explaining the operational principle of the class E amplifier. The class E amplifier is composed of one FET operated as a switch, a load circuit and a choke coil (RFC) for supplying direct power, and FET is periodically operated by a basic signaling frequency input to the gate from an external device as a switch.

The load circuit in the simplest form is composed of a capacitor parallel with FET and a series resonance circuit as shown in FIG. 2A and output having large amplitude can be acquired by setting its resonance frequency to a desired frequency. Besides, a wide-band amplifier can be acquired by using the low-pass filter 11 for the series resonance circuit.

In case voltage shown in FIG. 2B is applied to the gate, FET is turned on when gate voltage is at a low level, is turned off when the gate voltage is at a high level, and drain voltage has a triangular waveform the vertex of which is roundish as shown in FIG. 2C.

Current flowing in L1 is the sum of drain current Is and current Ic flowing because of a resistance component of the load circuit, has a waveform shown in FIG. 2D, as loss is equivalent to the product of these currents and voltage, it is very small and large efficiency can be acquired. As described above, the noncontact IC card reader/writer provided with the amplifier that can be efficiently operated can be realized.

As the radio transmitter 1 is hardly influenced by an external device and the receiver because of the first resonance circuit 4, the operation of a class E is constantly enabled by adjusting a constant so that the resonance frequency of the loading network 10 is a carrier frequency independent of whether the IC card is inserted or not. As described above, the noncontact IC card reader/writer provided with the amplifier that can be constantly efficiently operated can be realized.

Next, the low-pass filer 11 will be described in detail. To explain the details of the low-pass filter 11, C3 denotes a third capacitor, L3 denotes a third coil, C4 denotes a fourth capacitor, L4 denotes a fourth coil, C5 denotes a fifth capacitor, L5 denotes a fifth coil, the third capacitor C3 and the third coil L3 are connected in series between the input terminal of the low-pass filter 11 and the ground, further, the fourth coil L4 is connected to the input terminal, the fifth coil L5 is connected to the other end of the fourth coil L4, the other end of the fifth coil L5 functions as an output terminal of the low-pass filter 11, the fourth capacitor C4 one end of which is grounded is connected between the fourth coil L4 and the fifth coil L5, and the fifth capacitor C5 one end of which is grounded is connected to the other end of the fifth coil L5.

Concerning the operation, after a send signal is amplified in the class E amplifier 9 and the waveform is shaped in the loading network 10, an unnecessary high frequency is removed in the low-pass filter 11 composed of L4, C4, L5 and C5. Further, a fixedfold harmonic necessarily caused in the amplifier can be removed by setting the resonance frequency of a series resonance circuit composed of C3 and L3 to a fixedfold frequency of a carrier wave, and the noncontact IC card reader/writer excellent in filtering extraneous emission can be realized.

In case the loop antenna 3 and the antenna coil 13 are respectively regarded as a transformer, they are normally in loose coupling state when the noncontact IC card can communicate with the loop antenna, reactance caused in the loose coupling state can be negated by setting the series resonance circuit composed of C3 and L3 to a desired characteristic, only a resistance component is viewed from the loop antenna 3, and stable operation can be assured.

As described above, according to the noncontact IC card reader/writer equivalent to this embodiment, the noncontact IC card reader/writer provided with the amplifier that can be efficiently operated can be realized. The noncontact IC card reader/writer can greatly contribute to the population of an RF-ID system and greatly profits a field of noncontact IC card communication.

According to the invention, the following effect is produced. In the invention disclosed in the first aspect, as the resonance circuits dedicated to receiving and transmission are provided immediately after the loop antenna, the efficiency of the class E amplifier can be enhanced. In the invention disclosed in the second aspect, as FET is used for the switching device of the class E amplifier, a waveform is shaped in the loading network and a high frequency is removed in the low-pass filter, the amplifier in which the operation of the class E is constantly enabled can be realized. In the invention disclosed in the third aspect, as the resonance circuit in which the capacitor and the coil are connected in series is formed in the loading network, large output can be efficiently acquired. In the invention disclosed in the fourth aspect, as the resonance circuit in which the capacitor and the coil are connected in series is grounded in the low-pass filter and the low-pass filter is formed by the further higher-order low-pass filter, low extraneous emission can be realized. In the invention disclosed in the fifth aspect, as the capacitor and the coil arranged in series between the input terminal of the low-pass filter and the ground are shared with the reactance removing circuit, stable operation can be assured.

Therefore, according to the invention, the efficiency of the amplifier can be enhanced and the small-sized noncontact IC card reader/writer can be provided at a low cost.

CROSS REFERENCE TO RELATED APPLICATION

This application is based upon and claims the benefit of priority of Japanese Patent Application No. 2003-186822 filed on Jun. 30, 2003, the content of which are incorporated herein by references in its entirety.

What is claimed is:

1. A noncontact IC card reader/writer that communicates data with a noncontact IC card, comprising:
   an antenna, which supplies electric power and a transmitting signal to the noncontact IC card;
   a first resonance circuit, which resonates the antenna;
   a radio transmitter, which supplies both electric power and transmitting data to the antenna via the first resonance circuit; and
   a CPU that controls an operation of the radio transmitter, wherein the radio transmitter comprises a low-pass filter, an amplifier and a modulator, and the low-pass filter, the amplifier and the modulator are connected in series.

2. A noncontact IC card reader/writer according to claim 1, wherein:
   the class E amplifier comprises a FET for a switching device;
   the gate of the FET is connected to a signal generator;
   the drain of the FET is connected to both an end of a first coil and an end of a loading network; and
   the source of the FET is connected to the modulator.

3. A noncontact IC card reader/writer according to claim 2 wherein the loading network comprises a first capacitor, a second coil and a second capacitor, and a constant of the loading network is set to a desired value by arranging the first capacitor, the second coil and the second capacitor so that the functions as a class E amplifier.

4. A noncontact IC card reader/writer according to claim 3 wherein the loading network has an input terminal and an output terminal, wherein both an end of the first capacitor and an end of the second coil are connected to the input terminal of the loading network, the other end of the second coil is connected to the second capacitor and the other end of the second capacitor is connected to the output terminal of the loading net work.

5. A noncontact IC card reader/writer according to claim 4, wherein:
the low-pass filter has an input terminal and an output terminal,
the third capacitor and the third coil are connected between the input terminal and the ground in series,
an end of the fourth coil is connected to the input terminal,
an end of the fifth coil is connected to the other end of the fourth coil,
the other end of the fifth coil is connected to the output terminal of the low-pass filter,
an end of the fourth capacitor is connected between the fourth coil and the fifth coil, and
the other end of the fifth capacitor is connected to the other end of the fifth coil.

6. The noncontact IC card reader/writer according to claim 5, wherein:
the third capacitor and the third coil respectively arranged in series between the input terminal and the ground are also used for a compensating circuit for removing reactance.

7. A noncontact IC card reader/writer according to claim 3, wherein the low-pass filter comprises a third capacitor, a third coil, a fourth coil, a fifth coil, a fourth capacitor and a fifth capacitor.

8. A reader/writer that communicates data with a noncontact recording medium, comprising:
an antenna, which supplies electric power and a transmitting signal to the noncontact recording medium;
a first resonance circuit, which resonates the antenna;
a radio transmitter, which supplies both electric power and transmitting data to the antenna via the first resonance circuit; and
a CPU that controls an operation of the radio transmitter, wherein the radio transmitter comprises a low-pass filter, an amplifier and a modulator, and the low-pass filter, the amplifier and the modulator are connected in series.

9. A noncontact IC card reader that communicates data with a noncontact IC card, said reader comprising:
a loop antenna which supplies electric power and a signal to the non-contact IC card by electromagnetic induction and receives a signal from the non-contact IC card by load fluctuation;
a first resonance circuit which resonates the loop antenna with a first predetermined frequency;
a radio transmitter which supplies electric power and transmits data to said loop antenna via said first resonance circuit; and
a radio receiver which receives the signal from said loop antenna via a second resonance circuit coupled to said loop antenna via a coupling capacitor and resonated with a second predetermined frequency,
wherein said IC card reader includes a CPU, said radio transmitter includes a low-pass filter, a class E amplifier and a modulator, said radio transmitter and said radio receiver are respectively coupled to said CPU, said low-pass filter removes a high frequency, and said class E filter and said modulator are coupled in series with each other.

10. A non-contact IC card reader according to claim 9, wherein:
said class E amplifier includes a FET for switching, a signal generator for generating a signal and a first coil one end of which is coupled to a power source;
a gate of said FET is coupled to said signal generator;
a drain of said FET is coupled to the other end of said first coil; and
a source of said FET is coupled to said modulator.

11. A noncontact IC card reader according to claim 10, wherein:
said IC card reader further comprises a loading network coupled between said class E amplifier and said low-pass filter;
said loading network includes a first capacitor one end of which is grounded, a second capacitor and a second coil;
the other end of said first capacitor and one end of said second coil are coupled to an input terminal of said load network;
the other end of second coil is coupled to one end of said second capacitor;
the other end of second capacitor is coupled to an output terminal of said load network; and
a constant in said load network is determined to cause said class E amplifier to function in a condition of a class E.

12. A non-contact IC card reader according to claim 11, wherein:
said low-pass filter includes a third capacitor, a fourth capacitor, a fifth capacitor, a third coil, a fourth coil and a fifth coil;
said third capacitor and said third coil are coupled in series between an input terminal of said low-pass filter and ground;
one end of said fourth coil is coupled to an output terminal of said low-pass filter;
one end of said fifth coil is coupled to the other end of said fourth coil;
the other end of fifth coil is coupled to an output terminal of said low-pass filter;
said fourth capacitor has one end connected to ground and is coupled between said fourth coil and said fifth coil; and
said fifth capacitor has one end connected to ground and is coupled to the other end of said fifth coil.

13. A noncontact IC card reader according to claim 12, wherein said third capacitor and said third coil function to remove reactance.

* * * * *